US011047076B2

(12) United States Patent
Aceves Tinajero et al.

(10) Patent No.: US 11,047,076 B2
(45) Date of Patent: Jun. 29, 2021

(54) KNITTED TENSILE STRUCTURES

(71) Applicant: NIKE, Inc., Beaverton, OR (US)

(72) Inventors: Juan L. Aceves Tinajero, Beaverton, OR (US); Jessica Small, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 148 days.

(21) Appl. No.: 16/251,659

(22) Filed: Jan. 18, 2019

(65) Prior Publication Data

US 2019/0223541 A1    Jul. 25, 2019

Related U.S. Application Data

(60) Provisional application No. 62/619,269, filed on Jan. 19, 2018.

(51) Int. Cl.
| | | |
|---|---|---|
| *D04B 1/10* | (2006.01) | |
| *D04B 1/12* | (2006.01) | |
| *A43B 1/04* | (2006.01) | |
| *D04B 21/10* | (2006.01) | |
| *D04B 21/20* | (2006.01) | |

(52) U.S. Cl.
CPC ............... *D04B 1/104* (2013.01); *A43B 1/04* (2013.01); *D04B 1/123* (2013.01); *D04B 21/10* (2013.01); *D04B 21/207* (2013.01); *D10B 2501/043* (2013.01)

(58) Field of Classification Search
CPC ...... D04B 1/104; D04B 1/123; D04B 21/207; D04B 25/02; D04B 21/10; A43B 1/04
See application file for complete search history.

(56) References Cited

U.S. PATENT DOCUMENTS

| | | | | |
|---|---|---|---|---|
| 2,657,561 A | * | 11/1953 | Holmes ............... | D04B 15/34 66/198 |
| 2,946,211 A | * | 7/1960 | Morancy .............. | D04B 1/18 66/200 |
| 3,137,150 A | * | 6/1964 | Mishcon ............. | D04B 1/104 66/169 R |
| 4,794,767 A | * | 1/1989 | Lombardi ........... | D04B 1/123 28/155 |

(Continued)

FOREIGN PATENT DOCUMENTS

| | | |
|---|---|---|
| CN | 1170054 A | 1/1998 |
| CN | 101715306 A | 5/2010 |

(Continued)

OTHER PUBLICATIONS

International Search Report and Written Opinion for International Patent Application No. PCT/US2019/014245 dated Apr. 10, 2019; 15 pages.

(Continued)

*Primary Examiner* — Danny Worrell
(74) *Attorney, Agent, or Firm* — Shook, Hardy & Bacon, L.L.P.

(57) ABSTRACT

A knit component may include a knit-in tensile area, which may include an opening at least partially bounded by a first intersecting portion and a second intersecting portion. A course of tensile material that is integrally knitted with the first intersecting portion via a knit stitch may include a float extending from the first intersecting portion, across the opening, to the second intersecting portion.

17 Claims, 7 Drawing Sheets

(56) References Cited

U.S. PATENT DOCUMENTS

| | | | | |
|---|---|---|---|---|
| 4,941,331 | A | * | 7/1990 | Cournoyer .............. D04B 1/104 66/196 |
| 7,389,657 | B2 | * | 6/2008 | Lonati .................... D04B 1/104 66/173 |
| 7,614,258 | B2 | * | 11/2009 | Cherok ................. A61F 2/0063 66/192 |
| 7,788,953 | B1 | | 9/2010 | McMurray et al. |
| 9,060,570 | B2 | * | 6/2015 | Huffa ................. A43B 23/0215 |
| 9,637,846 | B1 | * | 5/2017 | Kuo ....................... D04B 1/123 |
| 9,644,291 | B1 | * | 5/2017 | Kuo ........................ D04B 1/14 |
| 9,732,451 | B2 | * | 8/2017 | Lee ........................ D04B 15/02 |
| 10,731,279 | B2 | * | 8/2020 | Cox ....................... D04B 1/123 |
| 2017/0130373 | A1 | | 5/2017 | Lee et al. |
| 2017/0238644 | A1 | | 8/2017 | Meir et al. |
| 2019/0223556 | A1 | * | 7/2019 | Aceves Tinajero ...... D04B 1/24 |

FOREIGN PATENT DOCUMENTS

| | | |
|---|---|---|
| CN | 107205517 A | 9/2017 |
| CN | 107385656 A | 11/2017 |
| GB | 1 353 531 | 5/1974 |
| GB | 1 552 231 | 9/1979 |
| TW | 201632095 A | 9/2016 |
| WO | WO 2014/085205 A1 | 6/2014 |

OTHER PUBLICATIONS

Taiwanese Office Action with English Translation for Application No. TW 108102010 dated May 6, 2020; 22 pages.
First Office Action with English Translation Chinese Patent Application No. 201980007948.0 dated Jan. 29, 2021; 13 pages.
Intention to Grant received for European Patent Application No. 19703587.6, dated Jan. 25, 2021, 8 pages.

* cited by examiner

KNITTED TENSILE STRUCTURES

CROSS-REFERENCE TO RELATED APPLICATION(S)

This application claims benefit to U.S. Provisional Patent Application No. 62/619,269, filed Jan. 19, 2018, the entirety of which is hereby incorporated by reference herein.

BACKGROUND

The present embodiments relate generally to knit components and methods of manufacturing knit components, for example, knit components for use in apparel and footwear applications.

SUMMARY

A knit component may include a knit-in tensile area, which may include an opening at least partially bounded by a first intersecting portion and a second intersecting portion. A course of tensile material that is integrally knitted with the first intersecting portion via a knit stitch may include a float having a float length extending from the first intersecting portion, across the opening, to the second intersecting portion. The float length may be at least three needles long. The course of tensile material may have a diameter of at least 0.8 mm and a tensile strength of at least 25 kg-f, and may be integrally knitted with the second intersecting portion via a second knit stitch. The knit component may further include a second course of tensile material that is integrally knitted with the first intersecting portion, and the second course of tensile material may include a second float extending from the first intersecting portion, across the opening, to the second intersecting portion. A course of tensile material may include a second float having a second float length. The opening may have a shape consisting of a triangle, a square, a rectangle, a pentagon, an ellipse, or a circle. The first intersecting portion may conceal the knit stitch of the course of tensile material from a viewing angle facing a first surface of the first intersecting portion.

In another aspect, an upper may include a first knit-in tensile area that includes a course of tensile material extending across a plurality of openings, each opening being at least partially bounded by a plurality of intersecting portions and a plurality of arterial portions. The course of tensile material may be integrally knit with each intersecting portion of the plurality via one or more knit stitches and may include a plurality of floats (each having a float length) that each extend across one opening of the plurality of openings. The course of tensile material may have a medial-lateral orientation, and may extend from a lateral edge region to a medial edge region. The course of the tensile material may extend in a weft direction of the knit-in tensile area. The upper may also include a second knit-in tensile area comprising a second plurality of openings and a second course of tensile material, and the second knit-in tensile area may be located in a different region of the upper from the first knit-in tensile area. The first knit-in tensile area may be located in a midfoot region and the second knit-in tensile area may be located in a rearfoot region. The second course of tensile material may have a different orientation than the course of tensile material. Each of the plurality of openings may have a first shape and a first size, and each of the second plurality of openings may have a second shape and a second size.

In another aspect, a knitting method may include knitting a first course of a multi-bed knit structure on a first needle bed and a second needle bed, transferring a first plurality of stitches of the first course of the multi-bed knit structure to different needles to widen an opening, knitting a course of tensile material, including at least one stitch that interloops with the multi-bed knit structure and a float that spans the opening, knitting a second course of the multi-bed knit structure on the first and second needle beds, and transferring a second plurality of stitches of the second course of the multi-bed knit structure to different needles to narrow the opening. The float may have a float length of at least three needles, and the multi-bed knit structure may have a tubular knit structure.

Other systems, methods, features and advantages of the present disclosure will be, or will become, apparent to one with skill in the art upon examination of the following figures and detailed description. It is intended that all such additional systems, methods, features and advantages be within the scope of the present disclosure, and be encompassed by the following claims.

BRIEF DESCRIPTION OF THE DRAWINGS

The present disclosure can be better understood with reference to the following drawings and description. The components in the figures are not necessarily to scale, emphasis instead being placed upon illustrating the principles of the present disclosure. Moreover, in the figures, like referenced numerals designate corresponding parts throughout the different views.

The drawings described herein are for illustration purposes only and are not intended to limit the scope of the present disclosure in any way.

DETAILED DESCRIPTION OF THE PREFERRED EMBODIMENTS

Figure 1:
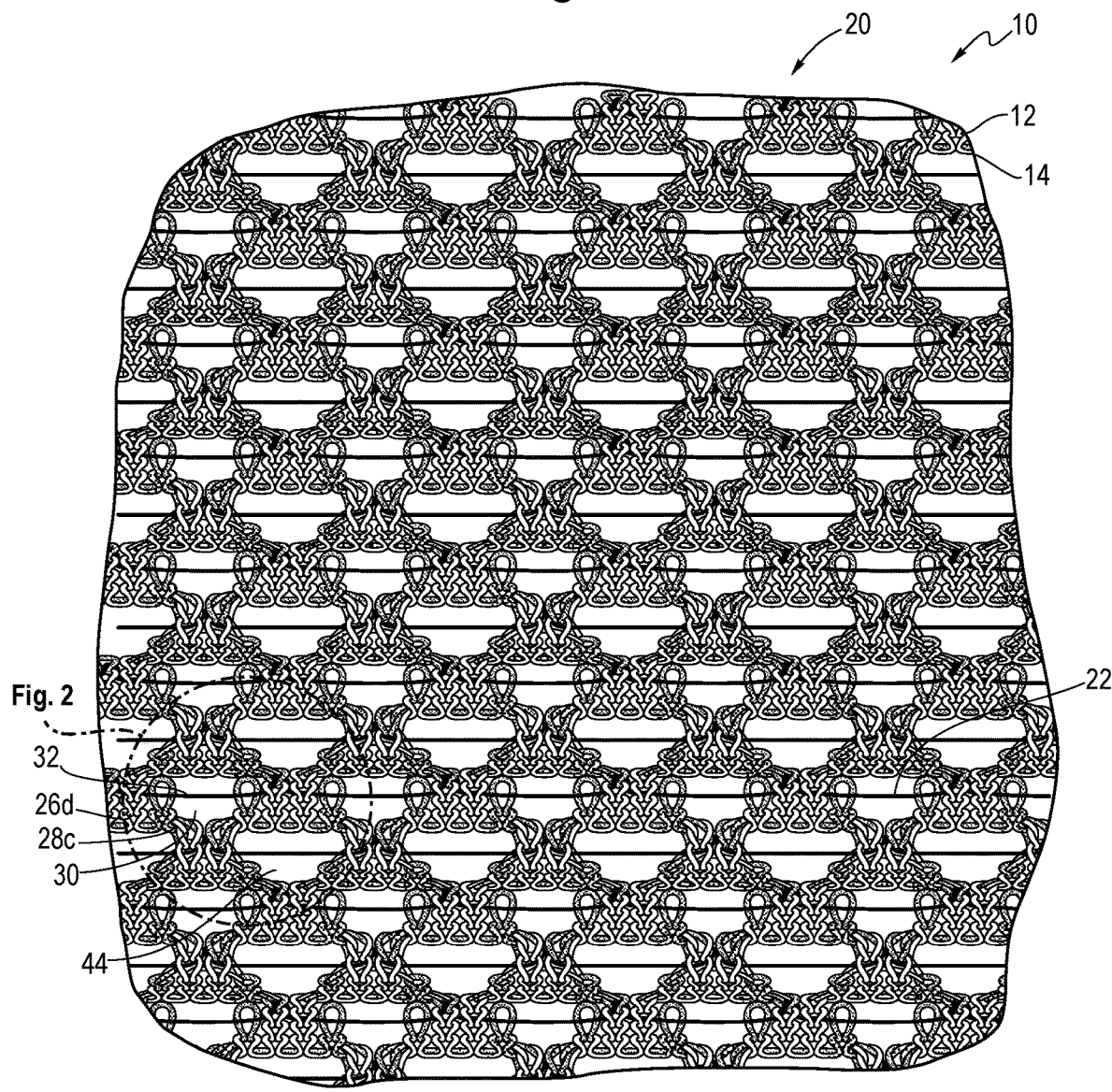
FIG. 1 is a sectional view of a knit component in accordance with one aspect of the present disclosure.
Figure 2:
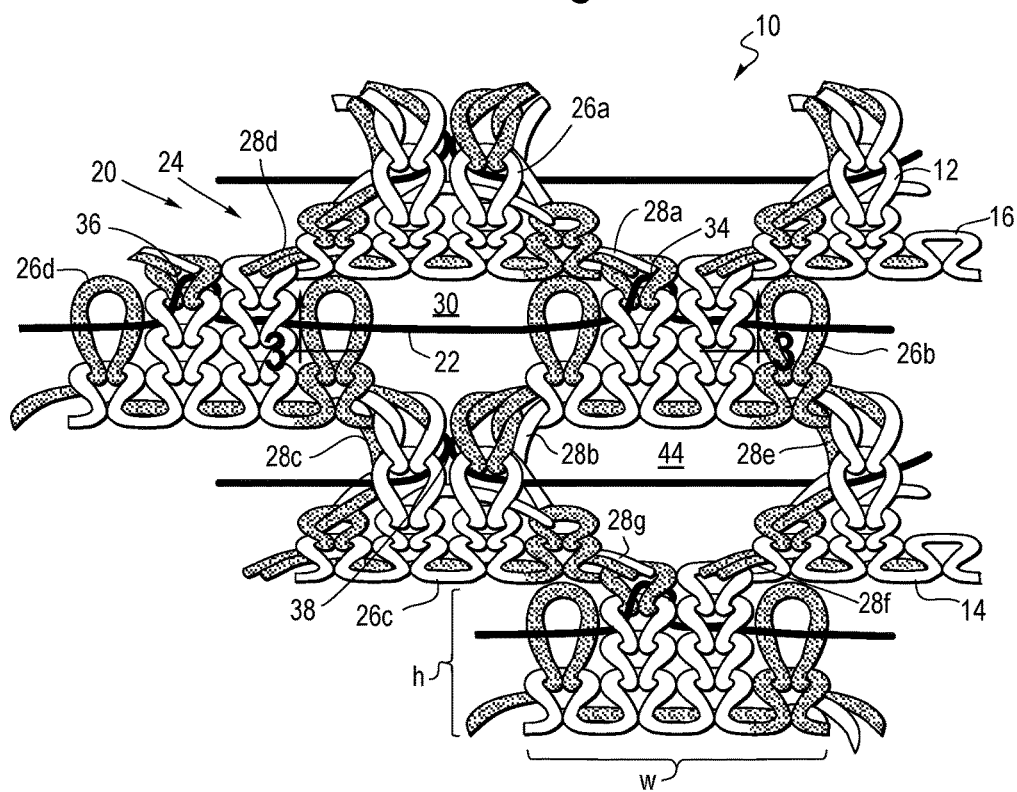
FIG. 2 is an expanded sectional view that shows another aspect of the knit component of FIG. 1.
Figure 3:
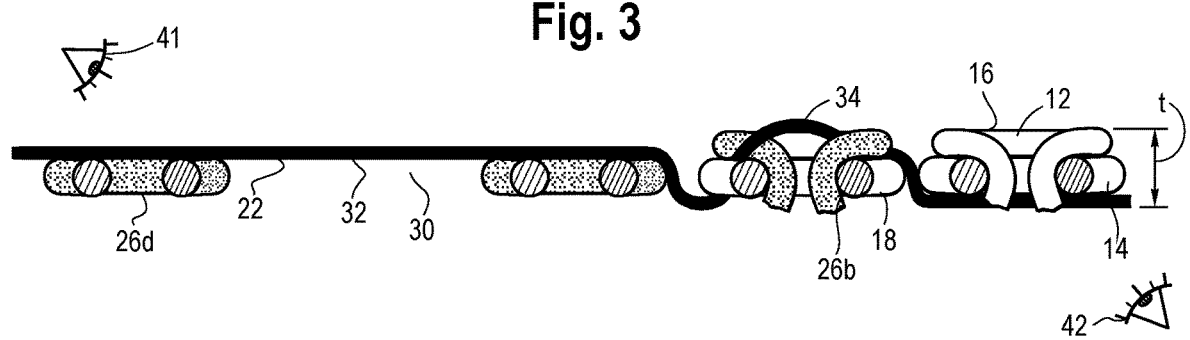
FIG. 3 is a cross-sectional view that shows another aspect of the knit component of FIG. 1.

Referring to FIGS. 1-3, a knit component 10 suitable for a number of applications, e.g., footwear and apparel, may be formed as an integral one-piece element from a single knitting process, such as a weft knitting process (e.g., with a flat knitting machine with one, two, or more needle beds, or with a circular knitting machine), a warp knitting process, or any other suitable knitting process. Knit component 10 may have integral knit construction in that it may be formed by a knitting process without the need for significant post-knitting processes or steps. Alternatively, two or more portions of knit component 10 may be formed separately as distinct integral one-piece elements, and then the respective elements may be attached. In all of the aforementioned cases, the resulting knit component may be formed via integral knit construction.

Knit component 10 may include at least a first layer 12 and a second layer 14. The first layer 12 and second layer 14 may be formed on one or more needle beds of a knitting machine, e.g., a first needle bed and/or a second needle bed. When the first layer 12 is formed on a different needle bed than the second layer 14, or when either of the first or second layers 12, 14 are formed on more than one needle bed, the resulting knit component 10 has multi-bed knit construction. As used in this application, the first layer 12 may form a first surface 16 comprising a first plurality of knit loops, and the second layer 14 may form a second surface 18 comprising a second plurality of knit loops. The first layer 12 may overlap at least a portion of the second layer 14, and the first and second layers 12, 14 may be coterminous in one or more dimensions but need not be coterminous. In some areas, the first layer 12 may be freely separable from the second layer 14. In other words, the first layer 12 and second layer 14 may have opposite facing internal surfaces. Although the first layer 12 may be freely separable from the second layer 14 in certain areas, it need not be freely separable. For example, knit component 10 may include one or more interlayer knit stitches that join the first and second layers 12, 14 (e.g., stitches formed between a first needle bed and a second needle bed on a weft knitting machine). Such interlayer knit stitches may be formed by the same yarn(s) that forms the first and/or second layers 12, 14, or a different yarn (such as a tensile material, discussed below). A single course of material may form both the first layer 12 and second layer 14, e.g., a knit structure formed on both a first and second needle bed that includes a first plurality of knit loops on a surface of the first layer 12 and a second plurality of loops on a surface of the second layer 14. Alternatively, different courses of material may form the first and second layers 12, 14, e.g., a first course forming a single jersey layer on a first needle bed and a second course forming another single jersey layer on a second needle bed.

Knit component 10 may include additional layers, e.g., to add cushioning, protection, or for other advantage. In various applications, the first layer 12 or second layer 14 may correspond with an outer or inner layer of an article of apparel, and exterior or interior layer of an upper for an article of footwear, or other application.

First and second layers 12, 14 may be knitted from the same or different materials, and may each be knitted from one or more materials, depending upon the application. For example, the first layer 12 may be knitted partially or completely from a material selected for durability, e.g., a material with relatively high abrasion resistance and tenacity. As another example, the second layer 14 may be knitted from a material selected for soft hand.

Still referring to FIGS. 1-3, the knit component 10 may include one or more knit-in tensile areas 20, which may be located where it is desirable to limit stretch, to improve ventilation, to permit visibility through knit component 10, and/or to provide additional technical properties. For example, knit component 10 may be incorporated into an article of footwear, and knit-in tensile area 20 may be positioned in a location where it is desirable to limit the movement of a wearer's foot in a medial and/or lateral direction. As another example, knit component 10 may be incorporated into a shirt, a pair of pants, or other garment, and knit-in tensile area 20 may be positioned where it is desirable to improve ventilation. As yet another example, knit component 10 may be incorporated into an industrial textile, and knit-in tensile area 20 may be positioned where it is desirable to have relatively high strength, minimal stretch, and relatively high permeability.

The knit-in tensile area 20 may include portions of the first layer 12 and the second layer 14, and also includes one or more courses of tensile material 22 that are integrally knitted into the first and/or second layers 12, 14. Suitable tensile materials include yarns formed with low-stretch/low-elasticity materials with relatively high tensile strength (e.g., at least approximately 25 kg-f) and high tenacity, e.g., cables, strands, and cords with a diameter of at least 0.5 mm (e.g., 0.8 mm or 0.5 mm-2.0 mm). Other suitable tensile materials may include strands or fibers having a low modulus of elasticity as well as a high tensile strength, such as strands of monofilament material, or fibers such as SPECTRA™ fibers, manufactured by Honeywell International Inc. (Morris Township, N.J.). Other suitable tensile materials may include various filaments, fibers, and yarns, formed from rayon, nylon, polyester, polyacrylic, silk, cotton, carbon, glass, aramids (e.g., para-aramid fibers and meta-aramid fibers), ultra-high molecular weight polyethylene, and liquid crystal polymer. As one non-limiting example, the tensile material may be a 1.0 mm diameter sheathed polyester cable having a minimum tensile strength of 30 kg-f and a maximum elongation of less than approximately 50%. The selection of the tensile material may be further influenced by knitting machine considerations. For example, the tensile material may have a sufficiently small diameter to permit periodic interlooping with the first and/or second layers 12, 14 without damaging the knitting machine, e.g., interlooping every third, fourth, fifth, sixth, seventh, eighth, or greater needle on a needle bed. Generally, the tensile material may have the same or different visual properties as other material that form the knit component. By utilizing a tensile material with at least one different visual property (e.g., a contrasting color or texture), the knit component may provide an attractive appearance.

Each course of tensile material 22 may include a single yarn or strand, or may include a plurality of yarns or strands of tensile material. For example, course of tensile material 22 may include a single 1.0 mm diameter sheathed polyester cable, or alternatively may include a plurality of smaller diameter strands of tensile material, e.g., each having a different color for visual effect or each having a different material composition.

Referring still to FIGS. 1-3, knit-in tensile area 20 may include one or more tensile structures 24, each of which may include a plurality of intersecting portions 26a-d and a plurality of arterial portions 28a-d that surround an opening 30. Each tensile structure 24 also includes at least one course of tensile material 22 that extends across opening 30 and is interlooped with at least one of intersecting portions 26a-d. Each intersecting portion 26a-d exists at a nexus of arterial portions 28a-d. Opening 30 may extend through knit component 10. Course of tensile material 22 includes a float 32 that spans opening 30 between adjacent intersecting portions 26b, 26d. In other embodiments, the float of tensile material need not span the opening across its largest dimension, and in other embodiments, a plurality of courses of tensile material may span the opening.

Course of tensile material 22 is integrally knitted into knit component 10, e.g., interlooped with at least one of intersecting portions 26a-d by one or more knit stitches as a result of the knitting process. The interlooping of course of tensile material 22 may be contrasted with an inlaying process that does not interloop the inlaid course with knit component. Integrally knitting course of tensile material 22 into knit component 10 advantageously secures it within knit component 10; otherwise, course of tensile material 22 could translate in the course-wise direction relative to knit component 10, e.g., due to a tensile force. In knit component 10 however, course of tensile material 22 may include a first stitch 34 that is interlooped with intersecting portion 26*b*, and an optional second stitch 36 that is interlooped with intersecting portion 26*d*. In other embodiments, course of tensile material 22 may include additional stitches that interloop with each intersecting portion. For example, in other embodiments, each course of tensile material may include two, three, or a greater number of stitches that interloop with each intersecting portion. As another example, in other embodiments, each course of tensile material may interloop with every other intersecting portion through which it passes. Generally, a course of tensile material may be integrally knitted with any aspect of an intersecting portion, e.g., portions of the first and/or the second layer that form the intersecting portion. Depending on how courses of tensile material are integrally knitted into the knit component, intersecting portions may conceal one or more stitches of course of tensile material from one or more viewpoints. For example, in the embodiment of FIGS. 1-3, first stitch 34 of course 22 is knitted into first layer 12; therefore first stitch 34 may be substantially or completely concealed from a viewpoint from which second layer 14 is visible. By comparison, stitch 38 is knitted into second layer 14, and therefore may substantially concealed from another viewpoint from which first layer 12 is visible.

Referring still to FIGS. 1-3, course of tensile material 22 includes float 32 that spans opening 30. Generally, each course of tensile material may include one or more floats that span one or more openings. Advantageously, float 32 may contribute to stretch resistance in the direction of the course of tensile material 22, and may also prevent passage of objects through opening 30 while preserving breathability of knit component 10. Float 32 is straight across opening 30 (e.g., taut); although in other embodiments (such as in FIG. 5), floats may not be straight (e.g., may have slack). Generally, a straight float may increase stretch resistance of the knit component because it limits mechanical stretch (as compared to a knit stitch or a float with slack, which may allow mechanical stretch, i.e., straightening of the course due to application of a tensile force). The distance along a float between stitches adjacent may define the float length, which may coincide with the distance along a float between adjacent intersecting portions. For example, in FIGS. 1-2, float 32 has a float length equal to the distance along float 32 between the first and second stitches 34, 36, which approximately coincides with the distance along float 32 between intersecting portions 26*b, d*.

Given its potentially higher stiffness and larger diameter relative to other materials that may form the knit component, the tensile material may be relatively difficult to knit on a knitting machine as compared to other materials. For example the course of tensile material 22 may be more difficult to knit than materials used to form first and second layers 12, 14. To alleviate these challenges and to facilitate knitting the tensile material, the float length of each course of tensile material may range from a small number of floated needles, e.g., two to three needles, up to a larger number of floated needles, e.g., five to ten needles. In embodiments such as FIGS. 1-3 where each course of tensile material (such as course 22) includes a plurality of floats (i.e., where the same course of tensile material extends across more than one opening), each float may have the same or different float length, e.g., to tailor the stretch resistance of the knit-in tensile area at particular location along the course of tensile material.

In some embodiments, a second float (e.g., a float of non-tensile material forming part of the first or second layers, or a float of tensile material) may also be integrally knitted with one or more intersecting portions and span the opening. From some viewpoints, the float of tensile material may obscure the second float of non-tensile material. The second float may further contribute to stretch resistance of the knit component. In other embodiments (as in FIG. 4), a plurality of courses of tensile material may span each opening between adjacent intersecting portions, and one or more of the plurality of courses of tensile material may be knitted into one or both of the adjacent intersecting portions. Additional courses of tensile material may contribute to greater stretch resistance.

In the embodiments of FIGS. 1-3, arterial portions 28*a-d* connect adjacent intersecting portions 26*a-d*. Each arterial portion 28*a-d* generally has an elongate shape, although the length of each arterial portion 28*a-d* may vary significantly between embodiments and within embodiments. For example, arterial portions 28*a-d* of FIG. 2 have a relatively short length, as intersecting portions 26*a-d* are relatively large. In other embodiments, the length of arterial portions may vary, even within the same embodiment. For example, a knit component may include a first knit-in tensile area including arterial portions with a relatively short first length, and a second knit-in tensile area including arterial portions with a longer second length. As the arterial portion length increases, the size of the openings in the knit-in tensile area tends to increase also, contributing to greater breathability and visibility through the knit component. Other embodiments may include arterial portions with more than one length.

Generally, arterial portions may intersect each other at a wide range of angles. For example, in FIGS. 1-2, arterial portions 28*f, g* may form an interior angle of approximately one hundred degrees, while arterial portions 28*e, f* form an interior angle of approximately forty degrees. In other embodiments, intersecting portions may form an angle ranging from approximately 30 degrees to up to approximately one hundred fifty degrees, e.g., 40, 50, 60, 70, 110, 120, or 130 degrees. Referring still to FIGS. 1-3, each arterial portion 28*a-d* may include yarns of first and second layers 12, 14 formed into knit loops. In other embodiments, arterial portions may not appear to include knit loops, but rather taught yarns due to tensile forces imparted by the knitting process. Although arterial portions 28*a-d* of FIGS. 1-3 are free of tensile material, in other embodiments, arterial portions may include one or more integrally-knitted courses of tensile material.

Referring still to FIGS. 1-3, each intersecting portion 26*a-d* may include yarns of the first and second layers 12, 14, and may have multi-bed knit construction. In each intersecting portion 26*a-d*, the first layer 12 may be predominantly visible from a first viewpoint 41, and the second layer 14 may be predominantly visible from a second viewpoint 42. Intersecting portions 26*b, d* substantially conceal stitches 34, 36 of tensile material from second viewpoint 42 (from which the second layer 14 is visible) because stitches 34, 36 are knitted into first layer 12. However, intersecting portion 26*c* substantially conceals stitch 38 from first viewpoint 41 (from which the first layer 12 is visible).

The appearance, dimensions, and structures of each intersecting portion may vary. In the embodiment of FIGS. 1-3, each intersecting portion (e.g., 26a-d) may have an elongate, web-like structure with a width, w, that exceeds a height, h, and a thickness, t, that approximates or exceeds the diameter of arterial portions 28a-d. Generally, height, h may increase with the number of courses of first and second layers contained within each intersecting portion. For example intersecting portions may include four to ten total courses of the first and second layers, e.g., eight courses. In the embodiment of FIGS. 1-3, intersecting portions 26b, d each includes eight courses: four double-bed courses of each of the first and second layers 12, 14, although courses of the first layer 12 are predominantly visible in FIGS. 1-2. Generally, the width, w, may increase with the number of wales of the first and second layers contained within intersecting portion. For example, an intersecting portion may include two to ten wales of the first and or second layers, e.g., four wales. In FIGS. 1-2, intersecting portions 26b, d each include four wales. Generally, thickness, t, of intersecting portion may approximate or exceed the diameter of arterial portions as a result from the interlooping of at least one course of tensile material with the first and/or second layers within each intersecting portion, as shown in FIG. 3. Loft inherent to the materials and structures forming the intersecting portions may also contribute to increased thickness relative to arterial portions.

Generally, the intersecting portions and arterial portions surround circular, oblong, or elliptical openings. Referring to FIGS. 1-3, opening 30 has an approximately square or pentagonal shape that is bounded by intersecting portions 26a-d and arterial portions 28a-d. Second opening 44 of FIGS. 1-2 has a roughly triangular shape, but in other embodiments, the openings may have a roughly circular, elliptical, oblong, square, rectangular, hexagonal, or other shape depending upon the dimensions of the intersecting portions and arterial portions. In other embodiments, an opening may have a first size (i.e., area) and may be bounded by three intersecting portions and three arterial portions. In still other embodiments, an opening may be bounded by a greater number of intersecting portions and arterial portions, e.g., five, six, or greater number. In other embodiments, a plurality of openings within a knit-in tensile area may have the same or different shapes and sizes.

Figure 4:
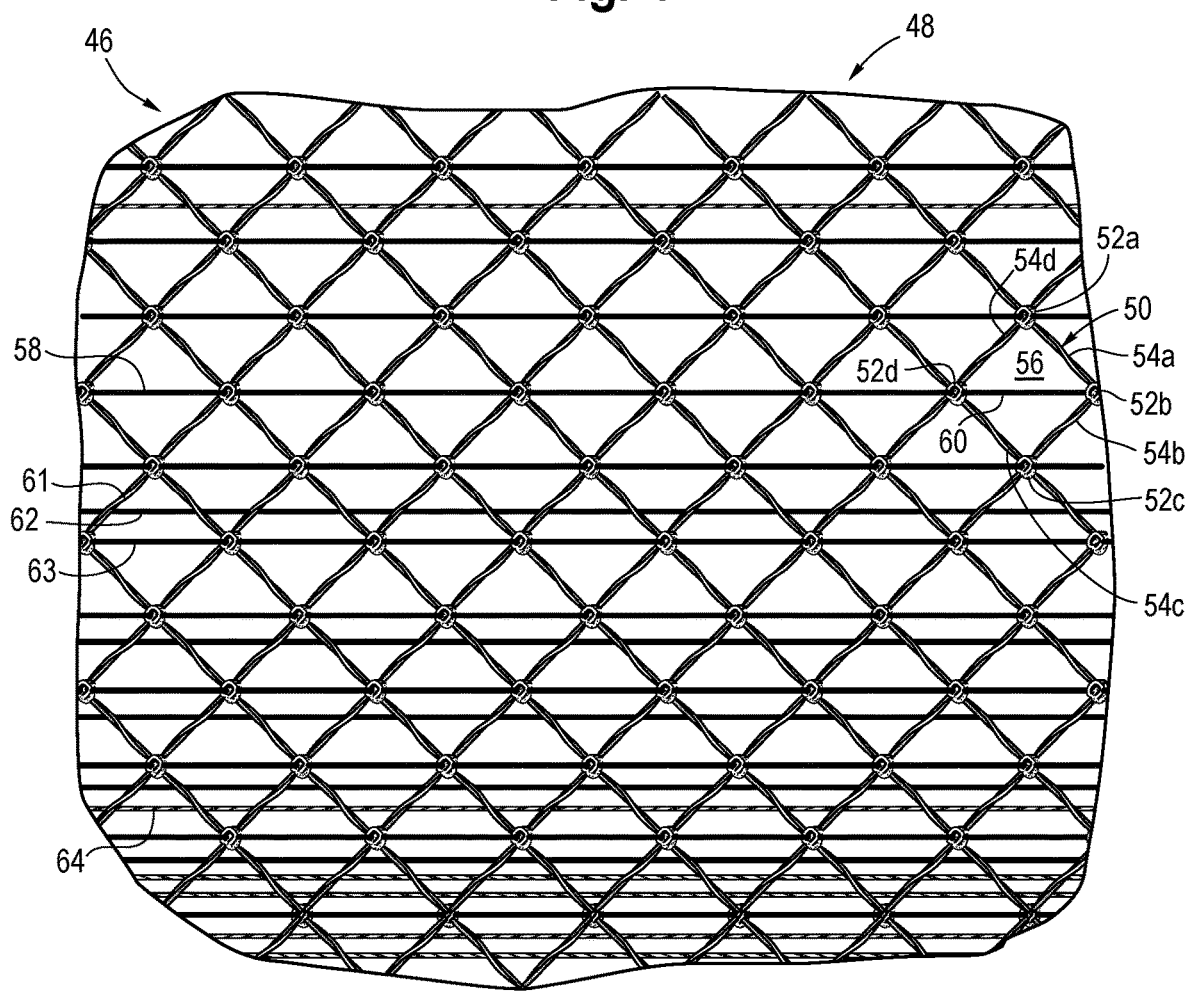
FIG. 4 is a sectional view of another knit component in accordance with another aspect of the present disclosure.

Referring now to FIG. 4, another knit component 46 is shown that includes a knit in tensile area 48, which is formed from a plurality of first tensile structures. Exemplary first tensile structure 50 includes intersecting portions 52a-d and arterial portions 54a-d, which surround a square-shaped opening 56. A course of tensile material 58 spans opening 56 and interloops with intersecting portions 52b, d. Each intersecting portion 52a-d may have a knot-like structure with a height that is similar to its width, either or both of which may exceed the diameter of arterial portions 50a-d. That is, intersecting portions 52a-d may appear as a knot-like mass of yarns compared to relatively slender arterial portions 54a-d. Course of tensile material 58 includes a float 60 that spans opening 56 between intersecting portions 52b, d. Knit in tensile area 48 also includes a plurality of second tensile structures 61, which are similar to the first tensile structures 50 except that at least two courses of tensile material (e.g., courses 62, 63) span each opening. In other tensile structures of knit component 46, at least one course of non-tensile material (e.g., course 64) may span the opening, e.g., for the advantage of greater stretch resistance in the course-wise direction.

Figure 5:
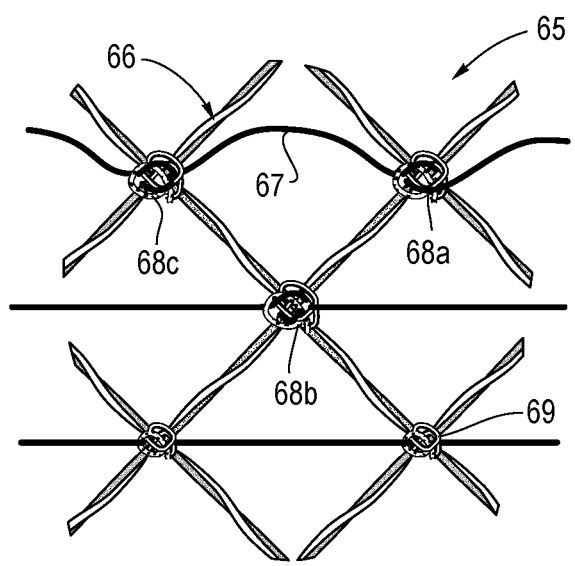
FIG. 5 is an expanded sectional view that shows another knit component in accordance with another aspect of the present disclosure.

In FIG. 5 an alternative knit-in tensile area 65 is illustrated that including a plurality of first tensile structures (that are similar to tensile structures 50 shown in FIG. 4), in addition to a plurality of second tensile structures 66 that each include a non-strait float (e.g., float 67, which may have slack or a U-shaped appearance) and intersecting portions 68a-c having a greater height and width relative to other intersecting portions (e.g., intersecting portion 69). However, intersecting portions 68a-c and 69 are similar in construction and in the fact that each intersecting portion may interloop with one or more courses of tensile material.

The foregoing knit components are merely exemplary and not intended to limit the scope of the present disclosure. Rather, other knit components of the present disclosure may include knit in tensile areas having different characteristics, including intersecting portions and openings with different shapes and sizes, arterial portions with multiple and different lengths, greater numbers of courses of tensile material spanning each opening, knit in tensile areas with different orientations relative to other knit in tensile areas, etc.

Knit components constructed with knit-in tensile areas according to the above structures may advantageously benefit from high stretch resistance in the direction parallel to the orientation of courses of tensile material. This stretch resistance is heightened by knitting the one or more courses of tensile material into at least one intersecting portion, as opposed to inlaying the courses of tensile material through the intersecting portions. Moreover, the float portions of the tensile material may further increase stretch resistance of the knit component by limiting mechanical stretch in the knit-in tensile area. Additionally, the knit component may also have high stretch resistance in the directions parallel to the arterial portions, which generally may extend straight between adjacent intersecting portions (e.g., may be taut between adjacent intersecting portions). Further, the knit component may have relatively high strength and resistance to tearing, owing to the intersecting portions which may secure the relative positions of intersecting arterial portions. As yet another advantage, the knit component may advantageously provide relatively high visibility and permeability due to the one or more openings formed in the knit-in tensile area. Additional advantages will be apparent to those skilled in the art.

Figure 6:
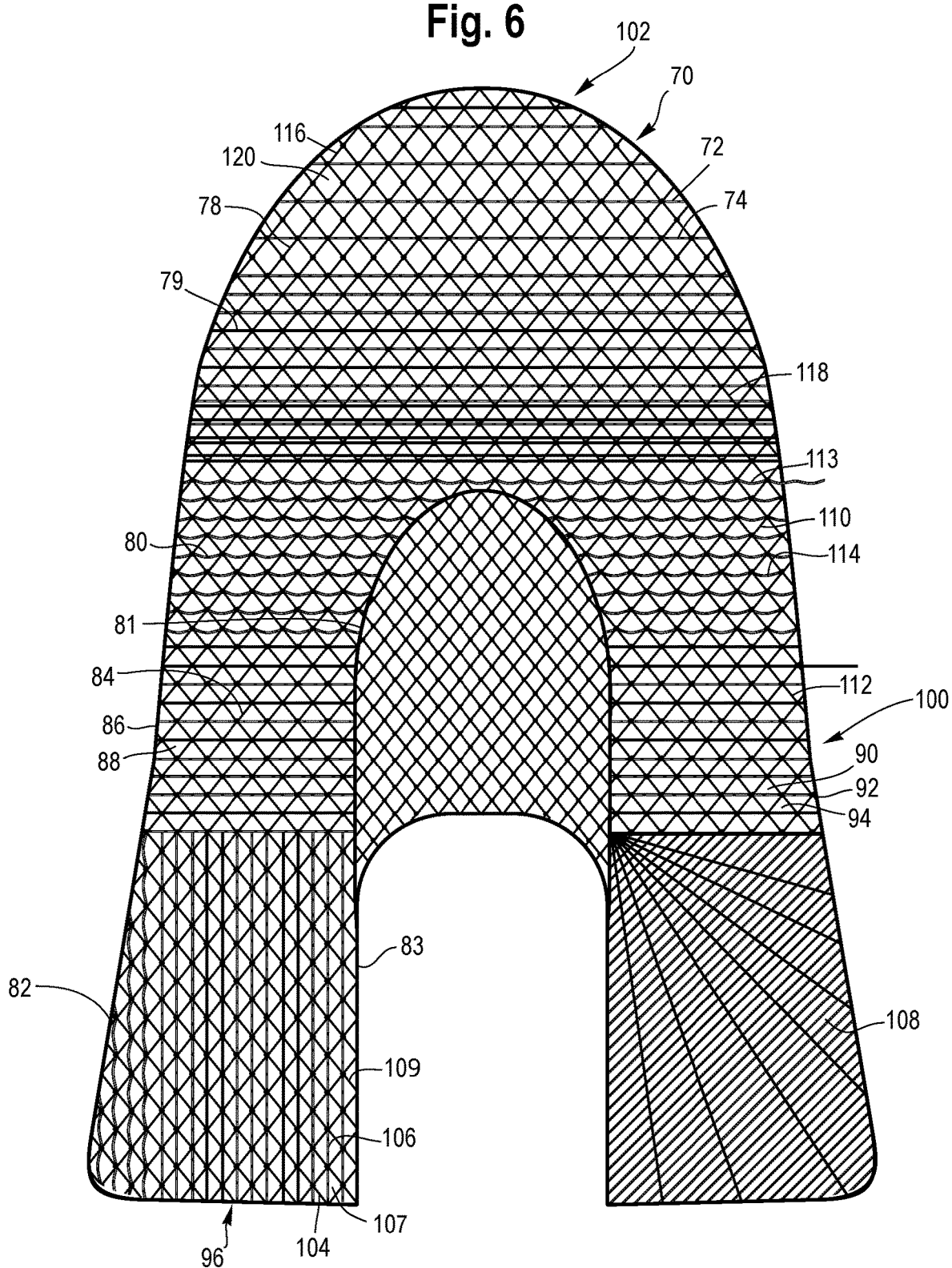
FIG. 6 is a sectional view of an upper in accordance with one aspect of the present disclosure.

Referring now to FIG. 6, an upper 70 for an article of footwear may include a knit component 72 having one or more knit-in tensile areas, especially where it is desirable to limit stretch, improve ventilation, or improve visibility through knit component 72. Each knit-in tensile area may include one or more tensile structures as described above. Upper 70 resembles a U-shape, however, it shall be understood that the "horseshoe-shape" or "U-shape" shape is merely exemplary, and other uppers embodying the disclosure of this application may be knitted with edges in different locations, for example a "C-shaped" uppers or a multiple-piece uppers. Knit component 72 includes a first layer 74 and a second layer (not shown). For reference purposes, upper 70 may be divided generally along a longitudinal direction (heel-to-toe) into three general regions: a forefoot region 78 having a forefoot edge region 79, a midfoot region 80, and a rearfoot region 82. Forefoot region 78 may generally include portions of upper 70 that may eventually cover (when incorporated into an article of footwear) the toes and the joints connecting the metatarsals with the phalanges. The midfoot region 80 may generally include portions corresponding with an arch area of the foot, and may include a throat region 81. The rearfoot region 82 may generally correspond with rear portions of the foot, including areas that cover the calcaneus bone (which comprises a portion of a wearer's heel). Additionally, the rearfoot region 82 may cover some or all of the wearer's malleoli and talus (which comprise a portion of the ankle). The rearfoot region 82 may coincide with a collar region 83. Upper 70 may also include a medial side 84 having a medial edge 86 and a medial edge region 88, and a lateral side 90 having a lateral edge 92 and a lateral edge region 94. Each of the medial and lateral sides 84, 90 may extend through each of the forefoot region 78, midfoot region 80, and rearfoot region 82, and may correspond with opposite sides. More particularly, lateral side 90 may correspond with an outside area of the foot (i.e., the surface that faces away from the other foot), and medial side 84 may correspond with an inside area of the foot (i.e., the surface that faces toward the other foot). The forefoot region 78, midfoot region 80, rearfoot region 82, medial side 84, and lateral side 90 are not intended to demarcate precise areas of upper 70 or knit component 72, but rather are intended to represent general areas to aid in the following discussion.

Referring still to FIG. 6, first layer 74 may eventually correspond with an exterior layer and the second layer may eventually correspond with an inner layer. Upper 70 also includes first knit-in tensile area 96 located in rearfoot region 82, a second knit-in tensile area 100 located in midfoot region 80, and a third knit-in tensile area 102 located in forefoot region 78. It shall be understood that knit structures present in any region of upper 70 may also be suitable in any other region of any upper.

First knit-in tensile area 96 is located on medial side 84 of knit component 72 and extends from collar region 83 to medial edge region 88. Courses of tensile material (e.g., course 106) extend from a rear edge region to midfoot region 80. Courses of first knit-in tensile area 96 may have a different orientation than courses of other knit-in tensile areas due to the use of gores or wedges (e.g., wedge 108) in the knit component 72. Generally, gores or wedges may be utilized to adjust the orientation of any knit-in tensile area.

First knit-in tensile area 96 may have similar knit structures (e.g., tensile structure 104) constructed as described above, with each tensile structure 104 including at least one portion of a course of tensile material (e.g., course 106) that is oriented in a longitudinal direction (which may correspond with a weft direction and a forefoot-rearfoot orientation) with a float that spans an opening (e.g., opening 107, which has a first float length). Arterial portions (such as arterial portion 109) extend from collar region 83, diagonally downward toward medial edge region 88. Other arterial portions extend diagonally upward. When incorporated into an article of footwear, first knit-in tensile area 96 may secure upper 70 around the rear of a wearer's foot by preventing longitudinal stretch. As first knit-in tensile area 96 may experience relatively low tensile forces as compared to other knit-in tensile areas, materials selected for these areas may differ from other knit-in tensile areas. For example, first knit-in tensile area 96 may include tensile material with a lower maximum tensile strength than tensile material utilized in other knit-in tensile areas. Similarly, due to relatively high abrasive forces that may be experienced in rearfoot region 82, materials utilized for first layer 74 may differ from other materials utilized elsewhere in knit component 72.

Second knit-in tensile area 100, located in midfoot region 80, includes a plurality of first tensile structures (e.g., structure 110 with a float having a second float length) and second tensile structures (e.g., structure 112 with a strait float having a third float length), both constructed as described above. Second knit-in tensile area 100 includes one or more courses of tensile material (e.g., course 113) extending from medial edge region 88 (including medial edge 86) to lateral edge region 94 (including lateral edge 92), and may also include one or more partial courses of tensile material (e.g., course 114) that extend from throat region 81 to lateral edge region 94 (including lateral edge 92) or medial edge region 88 (including medial edge 86). This medial-lateral orientation may correspond with a weft direction. Courses of tensile material may extend beyond medial and lateral edges 86, 92, e.g., to facilitate securing those courses to other structure, such as a sole structure, for the advantage of increased stretch resistance and strength. This medial-lateral configuration of tensile material in midfoot region 80 may advantageously contribute to a high degree of "lock down" or medial-lateral stability when upper 70 is incorporated into an article of footwear. In other embodiments, courses of tensile material in midfoot region 80 need not have a strictly medial-lateral orientation, but may extend diagonally (e.g., upward and forward) or may have another orientation. Given that midfoot region 80 will likely experience relatively high tensile forces, materials utilized in third knit-in tensile area 100 may differ from other materials used in knit component 72. For example, tensile material utilized in third knit-in tensile area 100 may have greater maximum tensile strength than tensile materials utilized in other knit-in tensile areas.

Third knit-in tensile area 102, located in forefoot region 78, includes a plurality of first tensile structures 116 and a plurality of second tensile structures 118. First tensile structures 116 may be spaced apart by one or more openings 120 that are free of tensile material. Spacing apart tensile structures may advantageously save weight and materials costs while increasing breathability and visibility through knit component 72. Second tensile structures 118 may each include more than one float of tensile material spanning each opening, e.g., for increased stretch resistance. Each course of tensile material extends from medial edge region 88 (including medial edge 86) to lateral edge region 94 (including lateral edge 92), while third knit-in tensile area 102 extends from forefoot edge region 79 to midfoot region 80.

The foregoing knit-in tensile structures are exemplary and not intended to limit the scope of the present disclosure. Rather, other knit-in tensile structures in other embodiments may utilize one or more features of any of the foregoing examples, and may have additional differences. For example, a knit component may include first and second knit-in tensile areas. Floats in the first knit-in tensile area may have a first float length and the openings may have a first shape (e.g., square, circular, elliptical, triangular, etc.) and a first size, whereas floats in the second knit-in tensile area may have a second float length that is the same or different from the first float length. Likewise, openings in the second knit-in tensile area may have openings with the same or different shapes and sizes as the first knit-in tensile area. In the same or other embodiments, along each course of tensile material, the float length of different floats may differ.

Figure 7:
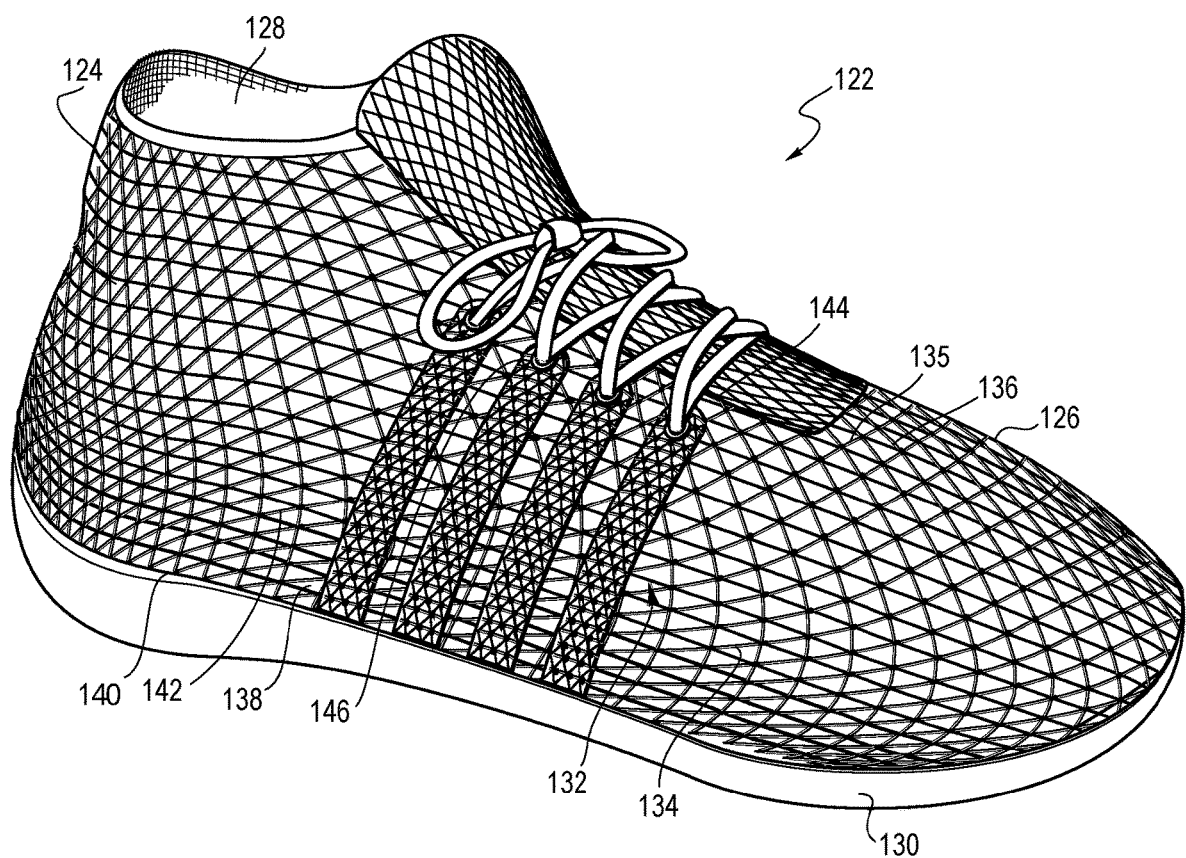
FIG. 7 is a perspective view of an article of footwear in accordance with one aspect of the present disclosure.

In FIG. 7 an article of footwear 122 is shown that includes an upper 124 at least partially formed with a knit component 126. Article 122 has a general configuration suitable for walking or running. Concepts associated with footwear, including upper 124 and knit component 126, may also be applied to a variety of other athletic footwear types, including but not limited to baseball shoes, basketball shoes, cross-training shoes, cycling shoes, football shoes, soccer shoes, sprinting shoes, tennis shoes, and hiking boots. The concepts may also be applied to footwear types that are generally considered to be non-athletic, including dress shoes, loafers, sandals, and work boots. The concepts disclosed herein apply, therefore, to a wide variety of footwear types. In the embodiment of FIG. 7, upper 124 may generally provide a comfortable and secure covering for a wearer's foot. As such, upper 124 may define a void 128 to effectively receive and secure a foot within article 122. Moreover, an optional sole structure 130 may be secured to a lower area of upper 124 and may extend between a wearer's foot and the ground to attenuate ground reaction forces (i.e., cushion the foot), provide traction, enhance stability, and influence the motions of the foot.

Article 122 may include one or more knit-in tensile areas, utilizing aspects from any of the knit component and upper examples described above. For example, knit component 126 of article 122 includes a first knit-in tensile area 132 positioned on a lateral side 134, and may also include a second knit-in tensile area positioned on a medial side (not shown). Courses of tensile material (e.g., course 135) may extend across an overfoot portion 136 of article 122, e.g., from a lateral edge region 138 (including lateral edge 140) to a medial edge region (including a medial edge). Additionally or alternatively, courses of tensile material (e.g., course 142) may extend partially over article 122, e.g., from lateral edge region 138 to a throat region 144. One or more courses of tensile material may be secured to sole structure 130, e.g., at lateral edge region 138, such as with adhesives or other joining methods. Securing one or more courses of tensile material to sole structure 130 may advantageously improve the media-lateral stability of article 122 by preventing movement of a wearer's foot within void 128. Courses of tensile material may also cooperate with a fastening system 146. For example, a lace may traverse an opening of a tensile structure, i.e., utilize the opening as a lace loop. Alternatively, fastening system 146 may attach to knit-in tensile area 132, e.g., for the benefit of providing a secure anchor point.

Figure 8:
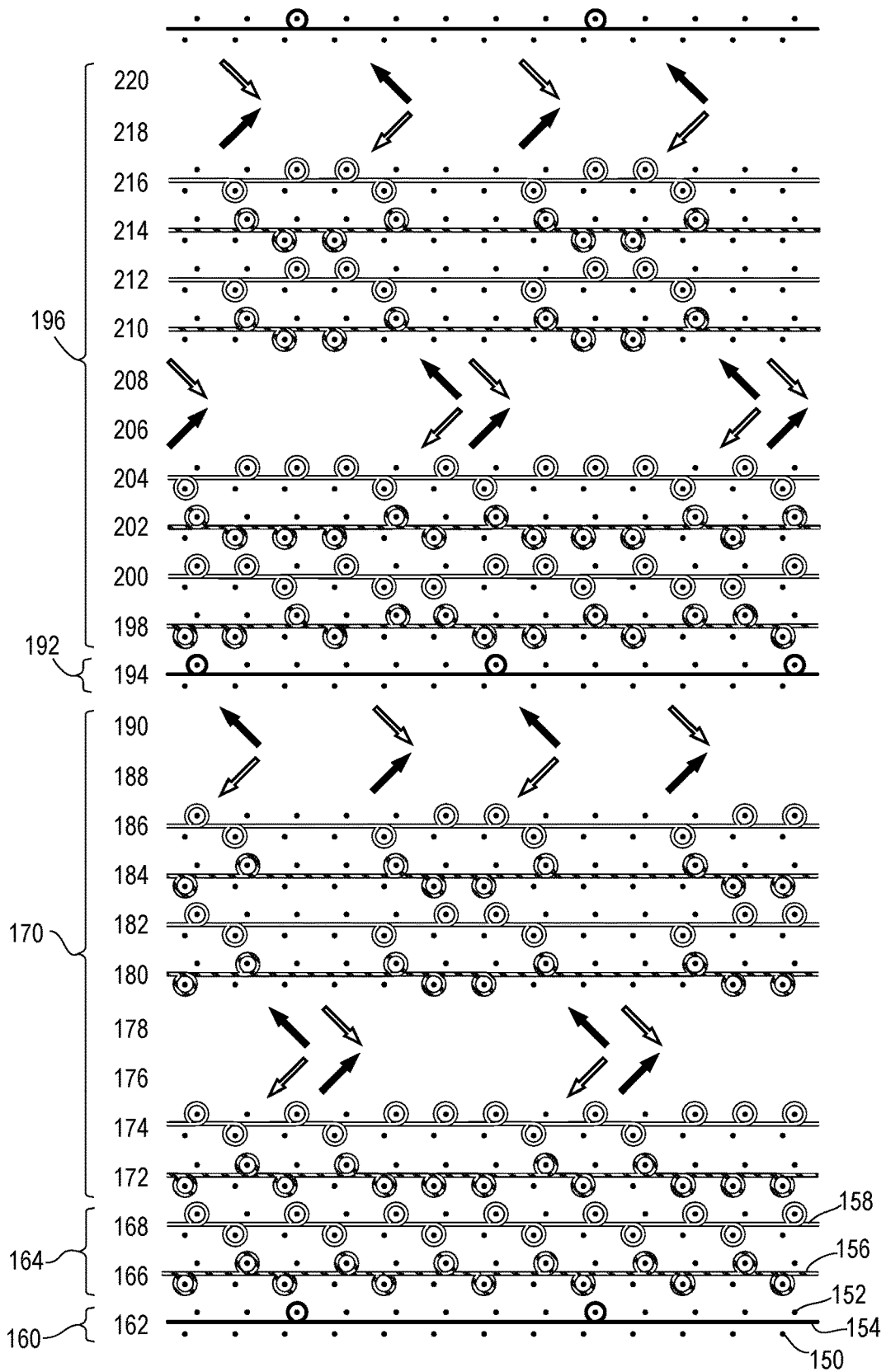
FIG. 8 is a knit diagram in accordance with one aspect of the present disclosure.

Referring now to FIG. 8 a knitting sequence is illustrated that may be utilized to form integrally-knit components as described above, such as through a weft knitting process (e.g., with a flat knitting machine with one, two, or more needle beds). The non-limiting sequence of FIG. 8 is illustrated on a weft knitting machine having a first needle bed 150 and a second needle bed 152. The knitting sequence illustrates the formation of a knit-in tensile area that utilizes courses of a tensile material 154, along with courses of a first material 156 and a second material 158 to form a first and a second layer.

At a first step 160, the knitting machine forms a course 162 of tensile material 154 by periodically knitting stitches on second needle bed 152, separated by floats. Each stitch may be knitted into an intersecting portion, and each float may span an opening formed in previous knitting steps (not shown). The floats each skip a number of needles between knit stitches, e.g., two to ten needles. In other words, the floats may have a float length of at least two needles. In FIG. 8, for example, the floats formed during course 162 each skip five needles. In other embodiments, the float length may be longer or shorter, for example, depending upon the properties of the tensile material (e.g., diameter and stiffness) that influence how easily it knits on the knitting machine, or depending upon whether the float will be straight or not (e.g., whether it is taut or slack), or depending upon the size of the openings in the knit component. In still other embodiments, a single course of tensile material may include floats having more than one float length. In first step 160, the knitting machine fixes the position of course 162 within the knit component by interlooping with one or more previously-knitted courses, and prepares course 162 to interloop with intersecting portions of the knit component in subsequent steps. In first step 160, all stitches of course 162 (of tensile material 154) are formed on second needle bed 152, where they will interloop with stitches of the second layer in subsequent steps. Alternatively, stitches of courses of tensile material may be formed entirely or in part on first needle bed 150 to prepare for subsequent interlooping with stitches of the first layer. By forming all stitches of course 162 on a single needle bed, the finished knit component may conceal those stitches from at least one viewpoint. For example, by knitting loops of course 162 on second needle bed 152 where those stitches will interloop with one or more courses of the second layer, those stitches of course 162 may be concealed from a first viewpoint where the first layer is visible.

At a second step 164, the knitting machine closes course 162 of tensile material 154 knitted at first step 160 by knitting courses of first and second materials 156, 158, respectively. For example, in FIG. 8, courses 166, 168 form an interlock knit structure of first and second materials 156, 158. Both of courses 166, 168 include stitches formed on both the first and second needle beds 150, 152. In this step, at least one of courses 166, 168 interloops with stitches of course 162 of tensile material 154 knitted during first step 160. For example, in FIG. 8, course 168 of second material 158 interloops with each loop of course 162 of tensile material 154. However, in other embodiments, the first and/or second layers need not interloop with all loops of the tensile material.

Following first and second steps 162, 164 the knitting machine will have knitted one or more intersecting portions at each location where the interlocking courses of first and second materials 156, 158 interloop with knit stitches of tensile material 154. Additionally, the knitting machine will have knitted one or more floats of tensile material 154 across openings formed by previous knitting steps (not shown).

At a third step 170, the knitting machine begins to form intersecting portions, openings, and arterial portions in the knit component by alternating between knitting additional courses of first and second materials 156, 158 and by executing inter-needle transfers of stitches of those courses. In FIG. 8, course 172 of first material 156 and course 174 of second material 158 form a multi-bed knit structure that initially does not form part of an opening. For example, courses 172, 174 may form a tubular knit structure. Subsequently however, the knitting machine executes transfer steps 176, 178 that move knit stitches of courses 172, 174 to other needles. The locations of these transfers coincide with floats of tensile material 154 that will be knitted in subsequent steps. More specifically, transfer steps 176, 178 pull stitches of courses 172, 174 apart from each other, thereby creating openings and forming arterial portions of the knit component around the openings. Following transfer steps 176, 178, the knitting machine knits optional courses 180-186 and executes additional transfer steps 188, 190 to further widen the openings and lengthen arterial portions. In other embodiments having smaller openings and shorter arterial portions, courses 180-186 and transfers 188, 190 may not be necessary. Likewise, in other embodiments having larger openings and longer arterial portions, third step 170 may include additional courses and transfers. Following first through third steps 160, 164, 170, the knitting machine will have knitted one or more intersecting portions and one or more partial openings in the knit component.

At a fourth step 192, the knitting machine knits another course 194 of tensile material 154 by periodically knitting stitches on second needle bed 152, separated by floats that span the partial openings formed during third step 170.

Where course 194 of tensile material 154 forms stitches on second needle bed 152, it forms part of additional intersecting portions of the knit component.

At a fifth step 196, the knitting machine completes the openings started in third step 170 by alternating between knitting additional courses of first and second materials 156, 158 and executing additional inter-needle transfers. In FIG. 8, courses 198, 202 of first material 156 and courses 200, 204 of second material 158 form a multi-bed knit structure (e.g., tubular knit), similar to third step 170. Subsequently, the knitting machine executes transfer steps 206, 208 that move knit stitches of courses 198-204 to other needles. Unlike third step 170, when transfers pulled stitches apart (making the openings larger), transfer steps 206, 208 of fifth step 196 pull stitches together (making the openings smaller). In other words, third step 170 forms the widening part of the openings, whereas fifth step 196 forms the narrowing part of the openings. More specifically, transfer steps 206, 208 pull spaced-apart stitches of courses 198-204 toward each other, thereby narrowing the openings. Also, third step 170 may form arterial portions oriented a first direction, whereas fifth step 196 may form arterial portions oriented in a second direction. Following transfer steps 206, 208, the knitting machine knits optional courses 210-216 and executes additional transfer steps 218, 220 to further narrow the opening. In other embodiments having smaller openings, courses 210-216 and transfers 218, 220 may not be necessary. Likewise, in other embodiments having larger openings, fifth step 196 may include additional courses and transfers. Following first through fifth steps 160, 164, 170, 192, and 196, the knitting machine will have knitted a knit component with intersecting portions that are interlooped with tensile material, one or more complete openings spanned by floats of the tensile material, and one or more arterial portions.

Although the foregoing knitting sequence describes five steps for the sake of comprehensive description, fewer steps may be necessary to form a tensile structure. For example, a first step may involve forming a widening part of an opening, arterial portions, and intersecting portions (as in third step 170 discussed above). A second step may involve knitting a course of tensile material, including at least one stitch and a float that spans the opening, and continuing to form intersecting portions on either side of the float that may be integrally knitted with the tensile material (as described in fourth step 192 above). A third step may involve forming a narrowing part of an opening and additional arterial portions (as in fifth step 196 discussed above).

While various embodiments of the present disclosure have been described, the present disclosure is not to be restricted except in light of the attached claims and their equivalents. Rather, the embodiments discussed were chosen and described to provide the best illustration of the principles of the present disclosure and its practical application to thereby enable one of ordinary skill in the art to utilize the present disclosure in various forms and with various modifications as are suited to the particular use contemplated. It is intended and will be appreciated that embodiments may be variously combined or separated without departing from the present disclosure and all exemplary features described herein are applicable to all aspects of the present disclosure described herein. Moreover, the advantages described herein are not necessarily the only advantages of the present disclosure and it is not necessarily expected that every embodiment of the present disclosure will achieve all of the advantages described.

We claim:

1. A knit component, comprising:
   a knit-in tensile area, comprising:
   a first interesting portion;
   a second intersecting portion, wherein the first intersecting portion and the second intersecting portion at least partially bound an opening of the knit-in tensile area; and
   a course of tensile material that is integrally knitted with the first intersecting portion via a knit stitch formed with the course of tensile material, the course of tensile material comprising a float having a float length and extending from the first intersecting portion, across the opening, to the second intersecting portion, wherein the course of tensile material is free of stitches between the knit stich and the second intersecting portion.

2. The knit component of claim 1, wherein the course of tensile material has a diameter of at least 0.8 mm and a tensile strength of at least 25 kg-f.

3. The knit component of claim 1, wherein the course of tensile material is integrally knitted with the second intersecting portion via a second knit stitch.

4. The knit component of claim 1, further comprising a second course of tensile material integrally knitted with the first intersecting portion and comprising a second float extending from the first intersecting portion, across the opening, to the second intersecting portion.

5. The knit component of claim 1, wherein the course of tensile material comprises a second float having a second float length.

6. The knit component of claim 1, wherein the float length is extends at least three wales of the knit component.

7. The knit component of claim 1, wherein the opening has a shape consisting of a triangle, a square, a rectangle, a pentagon, an ellipse, or a circle.

8. The knit component of claim 1,
   wherein the first intersecting portion conceals the knit stitch of the course of tensile material from a viewing angle facing a first surface of the first intersecting portion.

9. An upper, comprising:
   a first knit-in tensile area, comprising:
   a course of tensile material extending across a plurality of openings, each opening being at least partially bounded by a plurality of intersecting portions and a plurality of arterial portions;
   the course of tensile material being integrally knit with each intersecting portion of the plurality via one or more knit stitches formed with the course of tensile material, and comprising a plurality of floats that each extend across one opening of the plurality of openings; and
   wherein each float has a float length, and
   wherein the course of tensile material is free of stitches with the plurality of arterial portions along each float length.

10. The upper of claim 9, wherein the course of tensile material has a medial-lateral orientation.

11. The upper of claim 9, wherein the course of tensile material extends from a lateral edge region to a medial edge region.

12. The upper of claim 9, wherein the course of the tensile material extends in a weft direction of the knit-in tensile area.

13. The upper of claim 9, further comprising a second knit-in tensile area comprising a second plurality of openings and a second course of tensile material, wherein the second knit-in tensile area is located in a different region of the upper from the first knit-in tensile area.

14. The upper of claim 13, wherein the first knit-in tensile area is located in a midfoot region and the second knit-in tensile area is located in a rearfoot region.

15. The upper of claim 13, wherein the second course of tensile material has a different orientation than the course of tensile material.

16. The upper of claim 13,
   wherein each of the plurality of openings has a first shape,
   wherein each of the second plurality of openings has a second shape.

17. The upper of claim 13,
   wherein each of the plurality of openings has a first size,
   wherein each of the second plurality of openings has a second size.

* * * * *

UNITED STATES PATENT AND TRADEMARK OFFICE
CERTIFICATE OF CORRECTION

PATENT NO. : 11,047,076 B2
APPLICATION NO. : 16/251659
DATED : June 29, 2021
INVENTOR(S) : Juan L. Aceves Tinajero and Jessica Small It is certified that error appears in the above-identified patent and that said Letters Patent is hereby corrected as shown below:

In the Claims
Claim 1, Column 14, Line 4: "interesting" should read --intersecting--.
Claim 1, Column 14, Line 16: "stich" should read --stitch--.
Claim 6, Column 14, Line 33: before "extends" delete "is".

Signed and Sealed this
Seventh Day of September, 2021

Drew Hirshfeld
*Performing the Functions and Duties of the
Under Secretary of Commerce for Intellectual Property and
Director of the United States Patent and Trademark Office*